United States Patent [19]

Froberg

[11] Patent Number: 4,582,521
[45] Date of Patent: Apr. 15, 1986

[54] MELTING FURNACE AND METHOD OF USE

[75] Inventor: Magnus L. Froberg, Granville, Ohio

[73] Assignee: Owens-Corning Fiberglas Corporation, Toledo, Ohio

[21] Appl. No.: 619,519

[22] Filed: Jun. 11, 1984

[51] Int. Cl.$^4$ .............................................. C03B 1/00
[52] U.S. Cl. ......................................... 65/27; 55/131; 65/134; 65/335; 432/1
[58] Field of Search ........................... 65/27, 134, 335; 55/474, 131; 432/1

[56] References Cited

U.S. PATENT DOCUMENTS

| | | | |
|---|---|---|---|
| 3,926,587 | 12/1975 | Squires | 55/131 X |
| 4,308,036 | 12/1981 | Zahedi et al. | 55/479 X |
| 4,338,112 | 7/1982 | Propster | 65/27 |
| 4,338,113 | 7/1982 | Hohman et al. | 65/27 |
| 4,349,367 | 9/1982 | Krumwiede | 65/27 |
| 4,350,512 | 9/1982 | Krumwiede | 65/27 |
| 4,362,543 | 12/1982 | Froberg | 65/27 |

Primary Examiner—Robert Lindsay
Attorney, Agent, or Firm—Ronald C. Hudgens; Patrick P. Pacella

[57] ABSTRACT

A process and apparatus for reducing the particulate emissions in exhaust gases for a glass melting furnace. This invention also may preheat glass batch to be charged to the furnace. An electrical charge is used to collect particulate from the exhaust gases and deposit them on oppositely charged solids. The counterflow of exhaust gases past the solids heats the solids for further processing resulting in the conservation of heat.

11 Claims, 4 Drawing Figures

MELTING FURNACE AND METHOD OF USE

TECHNICAL FIELD

This invention relates to a process and apparatus for reducing the particulate emissions in the exhaust gas from a glass melting furnace.

BACKGROUND ART

Methods are known in the art of glass manufacturing for preheating glass batch wherein glass-forming, batch ingredients are brought in direct contact with heated media within a chamber. The particulate or granular glass batch raw materials are brought in particle-particle heat exchange with media that has been heated with an external burner or heated with exhaust gases from a glass melting furnace. This method allows the exchange of large quantities of heat economically and uniformly.

The preheating of glass batch at times may generate high particulate emissions in the chamber. Often there also are particulate emissions in the flue gases exhausting from the glass melting furnace.

U.S. Pat. Nos. 4,338,112, 4,338,113 and 4,362,543 disclose processes which improved on known means for reducing the particulate emissions in the exhaust gas stream from a glass melting furnace. Cool exhaust gases were electrically charged and passed through an electrified bed of agglomerates to remove particulate from the spent gases.

DISCLOSURE OF INVENTION

According to this invention, I have provided a single means for reducing the particulate emissions in the exhaust gas stream from a glass melting furnace and for preheating of glass batch particulate to be charged to the furnace. Ionization of a particulate laden off gas stream from an industrial process is difficult if not impossible above temperatures of 1000° F. to 1200° F. It is the normal practice to cool the gas stream with an external means which usually consumes heat and lowers efficiency. My invention lowers the gas stream temperature by first subjecting it to a mass of pellets or other heat absorbing medium to extract heat. After that step reduces the temperature to 1000° F., the gas stream is subjected to the ionizer and collection phase. The pellets then go through the process and heat is conserved.

BEST MODE OF CARRYING OUT INVENTION

My invention includes durable heat transfer media formed of glass batch agglomerates, glass, ceramic, glass-ceramics, steel, stainless steel, aluminum, gravel or the like.

Figure 1:
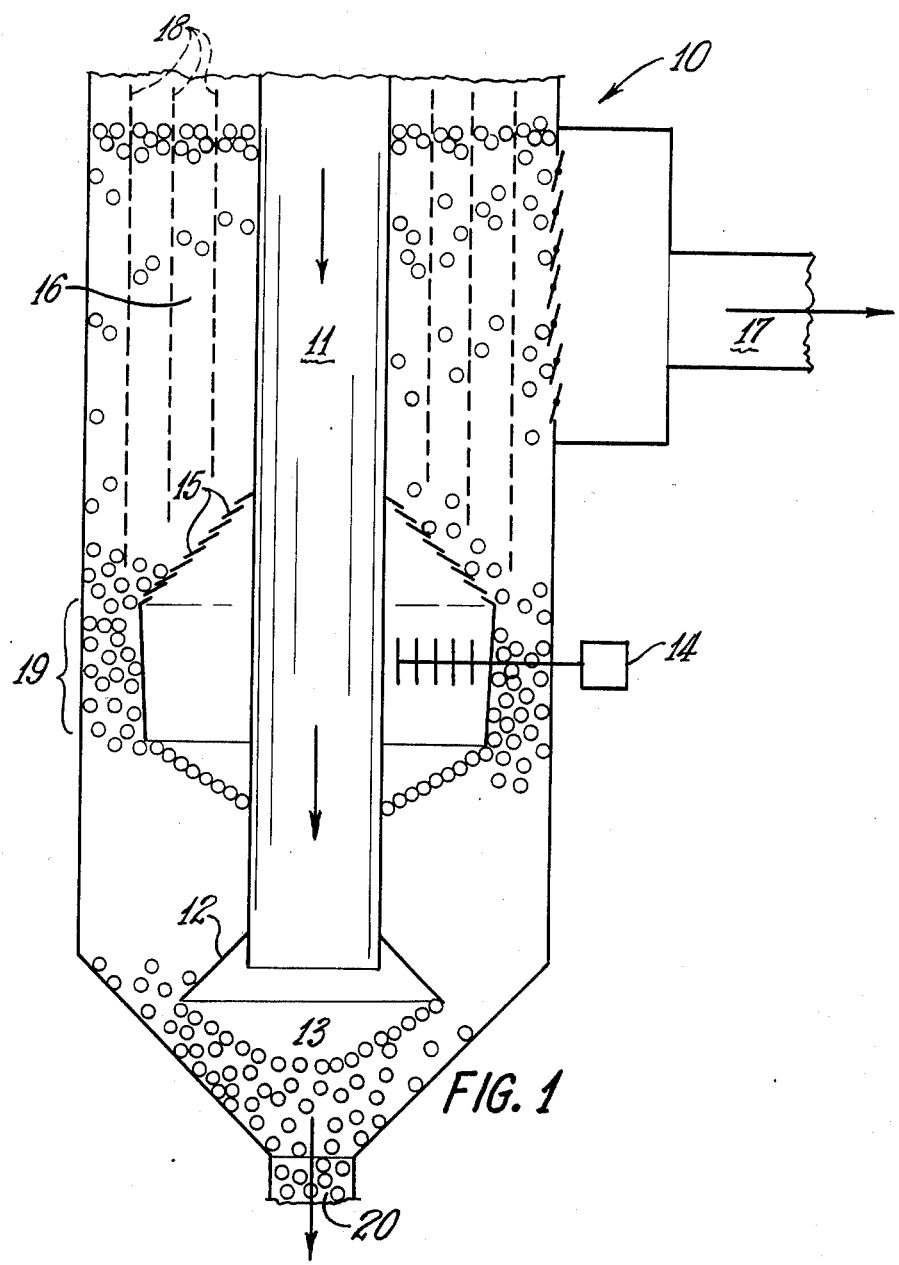
FIG. 1 shows a side view of the preferred apparatus of this invention.

In FIG. 1, heat transfer media may be heated with flue gases at a temperature normally ranging up to 1600° F. (872° C.) from a glass melting furnace.

In vessel 10, dirty exhaust gases are fed through internal conduit 11. Conduit 11 extends any suitable depth into vessel 10 and preferably terminates in truncated cone 12 having an opening 13 in the lower end of vessel 10. The dirty exhaust gases flow down conduit 11 and under cone 12 to an area where heat is absorbed by a mass of media to lower gas temperatures to about 1000° F. (538° C.) The cooled exhaust gases flow past ionizer 14 where particulate in the exhaust gases is negatively charged. The negatively charged gases then flow through louvers 15 to positively charged area 16. Negatively charged particulate collects on positively charged media in area 16. The clean gas then flows to the atmosphere via conduit 17.

The media enters vessel 10 through grids 18 which places a positive charge on the media. Negatively charged particulate collects on the positively charged media, and the resulting coated media then flows through restricted area 19. Area 19 restricts the passage of media sufficiently to cause the flow of gases through ionizer 14 rather than area 19. The media densely packs area 19 so that the gases take the path of least resistance through ionizer 14. Media exits vessel 10 through opening 20.

A blower or fan (not shown) may pull clean exhaust gases from vessel 10.

Figure 2:
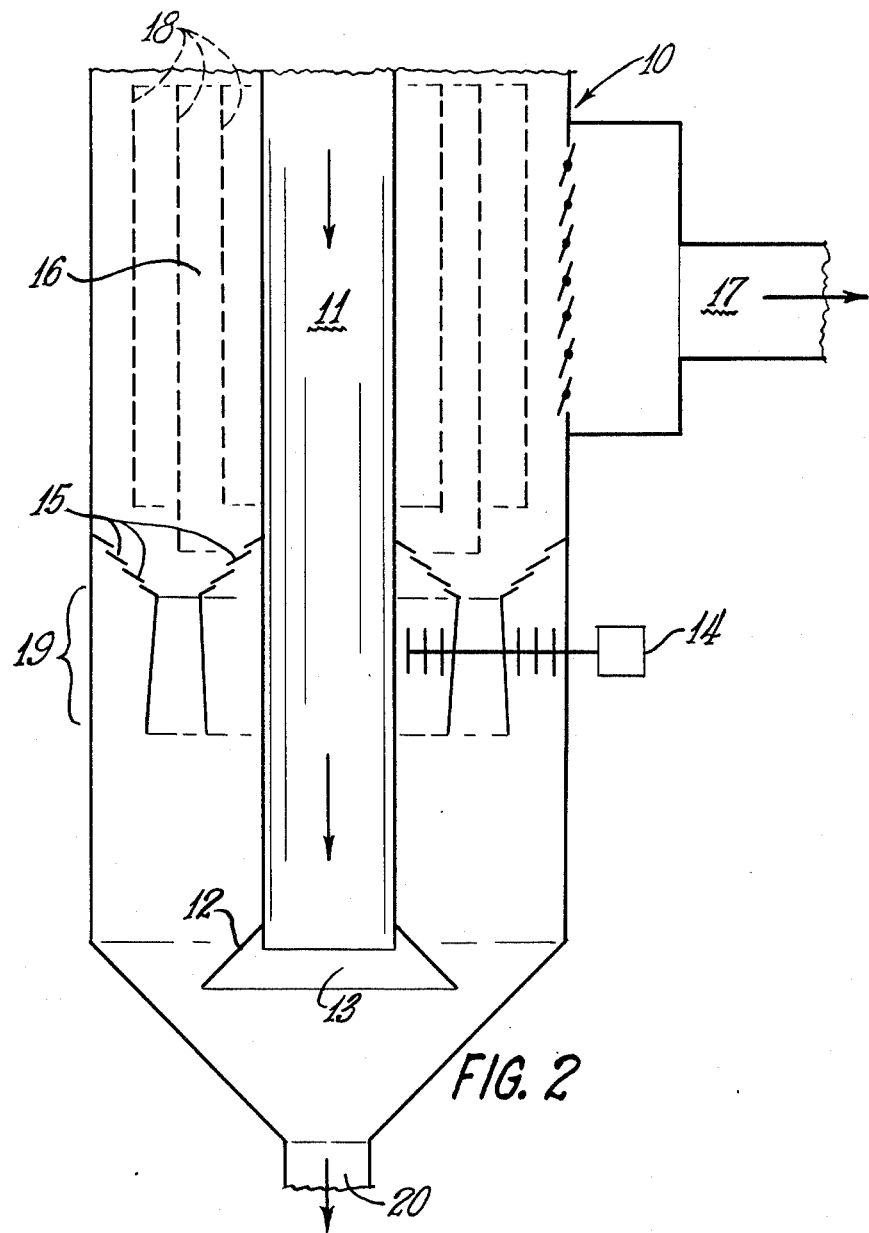
FIG. 2 shows an alternative embodiment of the apparatus of this invention.

FIG. 2 shows another embodiment where restriction 19 is more centrally located than in FIG. 1.

Figure 3:
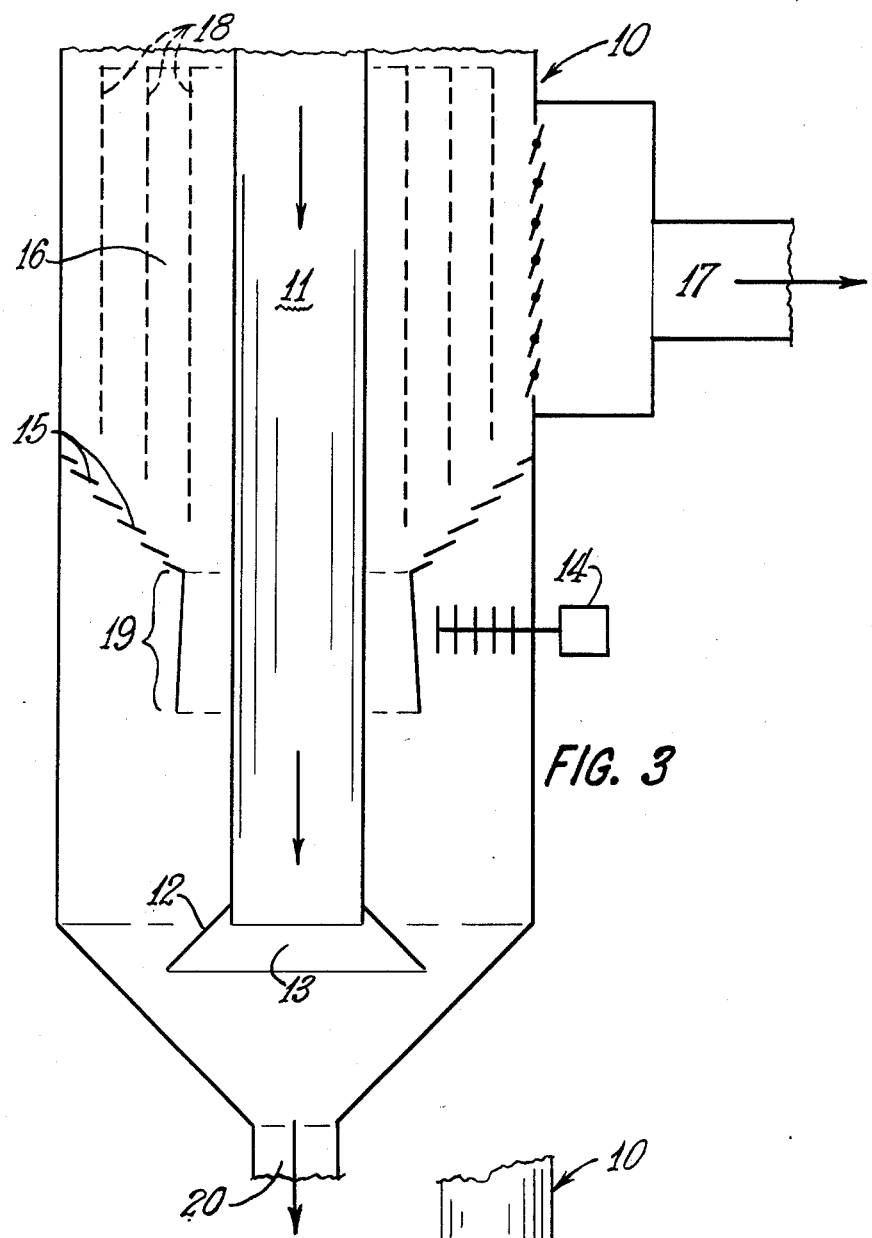
FIG. 3 shows another embodiment of the apparatus of this invention.

FIG. 3 shows another embodiment where restriction 19 is located in the innermost portion of unit 10.

Figure 4:
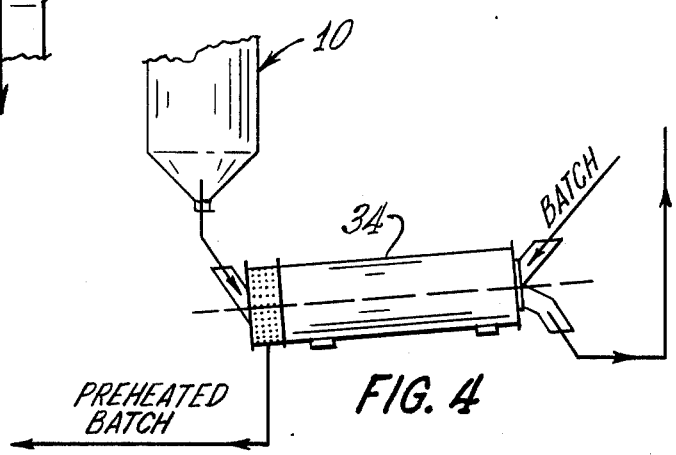
FIG. 4 shows still another embodiment of this invention.

FIG. 4 shows the solids from unit 10 being fed to rotary drum 34 to preheat batch for feeding to a melting furnace (not shown).

Preferably, the solids, e.g., media or agglomerates, are electrically charged and the particulate in the gas stream is given an electrical charge of an opposite polarity. The charged solids then act as collection sites for the oppositely charged particulate in the exhaust gases.

In another embodiment, a suitable electrical charge is also provided. Particulate entrained in the exhaust gas is electrically charged. An electric field is then employed to polarize the solids or media in the upper region of the chamber. The electric field produces caps of positive and negative charges on each solid. The charge caps then act as collection sites for previously charged particulate in the exhaust gases.

INDUSTRIAL APPLICABILITY

Generally, this invention is employed in a glass melting furnace from which molten glass issues. A shaft type vessel 10 maintains a vertical bed of agglomerates, with vessel 10 preferably containing an upper substantially cylindrical portion and a lower inverted frustoconical portion. Hot exhaust gases are conveyed to a lower portion of vessel 10 and passed countercurrently to the gravitationally downwardly flow of the agglomerates therein so as to preheat the agglomerates to an elevated temperature. The agglomerates, in turn, remove any particulate from the furnace exhaust gas. The heated agglomerates are discharged from the lower portion of the preheater and, without significant cooling, are directly transmitted to a glass melting furnace.

In another embodiment, the media may be heat transfer media rather than agglomerates of glass batch.

In operation, the media of vessel 10 become coated with collected particulate. When the desired amount of coating and temperature level has taken place, the bed media is removed, and recycled media is introduced continuously. The coated media is removed to heat exchange drum 34 where the particulate is removed from the media and the batch is heated. The media is recycled back to vessel 10 for reuse. The particulate, which generally is glass batch, is collected and charged with the preheated batch directly to a glass melting furnace.

The cylindrical drum 34 shown in FIG. 4 typically is inclined at an angle. In the preferred embodiment, the batch charging end of the container is elevated above the media charging end. While the angle can vary widely, generally the drum will form an acute angle with a horizontal line no greater than about 45° and typically less than 15°. Preferably, the angle is less than 5°.

In order to bring the batch in direct contact with the hot media, an arrangement of baffles is attached to the interior of the container. These baffles are 2 to 3 inches wide. These baffles usually are bolted to the walls of the drum and extend the length of the drum. All of the baffles in combination with the rotation of the drum aid in tumbling the media and batch in direct contact with each other. Typically, cold batch is fed with a screw feeder (not shown) that extends into the interior of the drum. This extension into the drum aids in reducing the amount of batch that may leave the drum with media. In one embodiment, hot media also is fed with a screw feeder (not shown) that extends into the interior of the drum.

While the tumbling of the media and batch occurs through agitation from the baffles and rotation of drum, movement of the batch and media through the drum is believed to occur in the following manner. The media and batch form gradients in the drum and generally flow downhill in a direction along the gradients and in opposite directions. The batch and media tumble and move over each other as they flow from the high end to the low end of the pile of material in the container.

An embodiment for removing media from the drum comprises an expanded metal scroll (not shown) that contains over 70% openings or voids. Hole size in the scroll is important as the holes must be big enough to allow batch to fall through. Typically, the holes are similar to a diamond in shape and are 1 inch by ¾ inch in size. As the scroll rotates, the media moves along a spiral path from the cylindrical wall region of the drum to the media exit, which is generally the midregion or center of the drum. The scroll is attached to the drum and rotates with the drum causing the media to move along a spiral path through the scroll to the center of the scroll. The batch falls through the voids of the scroll back into the interior of the drum without being discharged with the media. The screw feeder usually extends past the scroll discharge so that batch will not be charged onto the scroll.

It is while the tumbling of the hot media and batch occurs that the particulate coating on the media from vessel 10 becomes mixed with the batch being heated in cylindrical drum 24. Movement of the media through the scroll also strips the coated particles from the media. The combined glass batch is heated in the drum and then charged to the glass melting furnace.

I claim:

1. A gas to solids contacting apparatus comprising:
   (a) a hamber having an upper portion and a lower portion;
   (b) at least one solid inlet conduit having an opening into the upper portion of the chamber;
   (c) at least one solid outlet conduit having an opening into the lower portion of the chamber;
   (d) at least one gas inlet conduit having an opening into the lower portion of the chamber;
   (e) at least one gas outlet conduit having an opening into the upper portion of the chamber;
   (f) means for placing an electrical charge on the solids located in the upper region of the chamber;
   (g) means for permitting the downwardly flow of solids from the upper region of the chamber to the lower portion wherein said means substantially reduces the flow of solids from the upper region to the lower region, wherein said means has holes of a size big enough to allow the solids to fall through and wherein said means and reduced flow of solids essentially restricts the upwardly flow of gases from the lower portion to the upper portion of the chamber;
   (h) means for permitting the upwardly flow of gases from the lower portion to the upper portion of the chamber wherein said means essentially restricts the downwardly flow of solids; and
   (i) means located with the means of (h) for placing an electrical charge on any particulate in the gases wherein the charge is of an opposite polarity than the charge of element (f).

2. An apparatus according to claim 1 including:
   a container;
   means for introducing the hot solids from the chamber of (a) into the container;
   means for introducing particulate material into the container;
   means for rotating the container; and
   means associated with the container for tumbling and mixing the hot solids and the particulate material in direct contact with each other during rotation of the container to heat the material prior to discharging from the container.

3. An apparatus for reducing the particulate in exhaust gas from a glass melting furnace comprising:
   (a) a vertical chamber having an upper region and a lower region;
   (b) means for introducing media into the upper region of the chamber;
   (c) means for removing hot media from the lower region of the chamber;
   (d) means for introducing hot exhaust gases into the lower region of the chamber;
   (e) means for removing cooled exhaust gases from the upper region of the container;
   (f) means for placing an electrical charge on the media located in the upper region of the chamber;
   (g) at least one passage connecting the upper region of the chamber with the lower region which permits the downwardly flow of media but which essentially prevents the upwardly flow of exhaust gases wherein said passage has at least one hole of a size big enough to allow the media to fall through;
   (h) at least one passage connecting the lower region of the chamber with the upper region which permits the upwardly flow of exhaust gases but which essentially restricts the downwardly flow of media; and
   (i) means located within the passage of (h) for placing an electrical charge on any particulate in the exhaust gases, said charge having the opposite polarity of the charge in element (f).

4. An apparatus according to claim 3 wherein the means for introducing hot exhaust gases into the lower region of the chamber terminates in a truncated cone.

5. An apparatus according to claim 3 wherein the means for introducing hot exhaust gases into the lower region of the chamber is generally vertical, centrally located and extends downwardly into the lower region of the chamber.

6. A process for heating solids with hot gases in a chamber having an upper region and a lower region including the steps of;
 (a) charging the solids to the upper region of the chamber;
 (b) charging the hot gases to the lower region of the chamber;
 (c) electrically charging the solids in the upper region of the chamber;
 (d) moving the solids to the lower region of the chamber through a passage having at least one hole of a size big enough to allow the solids to fall through and which essentially restricts the flow of gases upwardly;
 (e) moving the hot gases to the upper region of the chamber through a passage which essentially restricts the flow of solids downwardly;
 (f) electrically charging any particulate in the hot gases in the passage of step (e) wherein the charge is of opposite polarity of the charge in step (c); and
 (g) passing the electrically charged gases of step (f) through the electrically charged solids of step (c) in the upper region of the chamber.

7. A process according to claim 6 including the step of:
 (h) passing the hot gases of step (b) through the heated solids of step (g) in the lower region of the chamber.

8. A process according to claim 6 including the steps of:
 (i) removing the heated solids of step (h) from the lower region of the chamber; and
 (j) using the heated solids of step (i) to heat other particulate material.

9. A process according to claim 7 including the steps of:
 (i) removing the heated solids of step (h) from the lower region of the chamber;
 (j) introducing the hot solids into a container;
 (k) introducing particulate material into the container; and
 (l) rotating the container, during rotation the material and solids tumbling and moving over each other in heat transfer relationship.

10. A process for reducing the particulate in hot exhaust gases from a glass melting furnace comprising the steps of:
 (a) providing a vertical chamber having an upper region and a lower region;
 (b) feeding heat transfer media to the upper region of the chamber;
 (c) feeding the exhaust gases to the lower region of the chamber;
 (d) electrically charging the media in the upper region of the chamber;
 (e) moving the media to the lower region of the chamber through a passage having at least one hole of a size big enough to allow the media to fall through and which essentially restricts the flow of hot exhaust gases upwardly;
 (f) moving the hot exhaust gases to the upper region of the chamber through a passage which essentially restricts the flow of media downwardly;
 (g) electrically charging any particulate in the hot gases in the passage of step (f) wherein the charge is of an opposite polarity of the charge in step (d);
 (h) passing the electrically charged gases of step (g) through the electrically charged media of step (d) in the upper region of the chamber.

11. A process according to claim 1 including the step of:
 (i) passing the hot gases of step (c) through the heated media of step (h) in the lower region of the vertical chamber.

* * * * *